United States Patent
Marejka (10) Patent No.: US 7,512,950 B1
(45) Date of Patent: Mar. 31, 2009

(54) BARRIER SYNCHRONIZATION OBJECT FOR MULTI-THREADED APPLICATIONS

(75) Inventor: Richard Marejka, Nobleton (CA)

(73) Assignee: Sun Microsystems, Inc., Santa Clara, CA (US)

( * ) Notice: Subject to any disclaimer, the term of this patent is extended or adjusted under 35 U.S.C. 154(b) by 1005 days.

(21) Appl. No.: 10/641,172

(22) Filed: Aug. 14, 2003

(51) Int. Cl.
*G06F 9/46* (2006.01)

(52) U.S. Cl. ............................ 718/106; 718/102

(58) Field of Classification Search ............. 718/100, 718/102, 106
See application file for complete search history.

(56) References Cited

U.S. PATENT DOCUMENTS

| | | | | |
|---|---|---|---|---|
| 5,692,193 | A * | 11/1997 | Jagannathan et al. | 718/106 |
| 6,026,427 | A * | 2/2000 | Nishihara et al. | 718/106 |
| 6,237,019 | B1 * | 5/2001 | Ault et al. | 718/104 |
| 6,473,820 | B1 * | 10/2002 | Zhang | 710/240 |
| 6,510,437 | B1 | 1/2003 | Bak et al. | |
| 6,530,079 | B1 | 3/2003 | Choi et al. | |
| 7,353,515 | B1 * | 4/2008 | Ton et al. | 718/102 |

OTHER PUBLICATIONS

Bil Lewis, Daniel J. Berg, "PThreads Primer, A Guide to Multihreaded Programming," SunSoft Press pp. 1-184.
Michael K. Bane, Graham D. Riley, "Extended Overhead Analysis for OpenMP," pp. 1-5, Manchester, UK.
Franklyn Turbak, "First-Class Synchronization Barriers," pp. 1-12, Wesley College Computer Science Department.
ACE_Barrier Class Reference, pp. 1-3.
Multi-Threaded Programming With Posix Threads, Jun. 23, 2003, pp. 1-39, Retrieved from the Internet URL http://users.actcom.co.il/choo/lupg/tutorials/multi-thread/multi-thread.html.
Wim H. Hesselink, A Crossing withJava Threads and POSIX Threads, Oct. 15, 2001, pp. 1-8.
Steven S. Lumetta, David E. Culler, "Managing Concurrent Access for Shared Memory Active Messages," pp. 1-7.
Daniel Robbins, "POSIX threads explained," Retrieved from the Internet URL http// www106.ibm.com/developerworks/library/l-posix1, pp. 1-8.
Daniel Robbins, "Common threads: POSIX threads explained, Part 2," Retrieved from the Internet URL http://www-106.ibm.com/developerworks/library/l-posix2/ pp. 1-8.
Daniel Robbins, "POSIX threads explained, Part 3" Retrieved from the Internet URL http://www-106.ibm.com/developerworks/library/l-posix3/ pp. 1-11.

* cited by examiner

*Primary Examiner*—Meng-Ai An
*Assistant Examiner*—Kenneth Tang
(74) *Attorney, Agent, or Firm*—Marsh Fischmann & Breyfogle LLP; S. Langley; K. Lembke (57) ABSTRACT

Mechanisms and processes for synchronizing a group of threads that use a semaphore for each waiting thread to implement a barrier. A barrier is created comprising a counter, a semaphore list, and at least one mutual exclusion (mutex) lock. For each thread using the barrier, it is determined whether that thread is the last to arrive. For each thread that is not the last to arrive at the barrier, the thread is caused to wait on a semaphore. The last thread to arrive at the barrier causes each waiting thread to resume execution.

19 Claims, 6 Drawing Sheets

BARRIER SYNCHRONIZATION OBJECT FOR MULTI-THREADED APPLICATIONS

BACKGROUND OF THE INVENTION

1. Field of the Invention

The present invention relates, in general, to multi-threaded program execution, and, more particularly, to software, systems and methods for barrier synchronization in multi-threaded applications.

2. Relevant Background

An executing software application comprises one or more "processes" where each process is relatively independent of other processes. In general, each process is allocated its own resources, data structures, memory, and the like so that it executes as an atomic unit with little risk of interfering with other processes and little risk of being interfered with by other processes. The collection of computational resources allocated to a process is referred to as "context". In environments where the context can be dynamically switched, multiple processes can run concurrently creating an effect similar to multiple programs running simultaneously. Additionally, by breaking a complex software application down into multiple independent processes the resulting application is often easier to design and implement, and a more robust application results. However, switching between processes requires a significant amount of overhead as processing resources and memory are de-allocated from one process and re-allocated to a new process.

Computer environments often support processes with multiple threads of execution (i.e., threads) that can work together on a single computational task. The term "thread" in a general sense refers merely to a simple execution path through application software and the kernel of an operating system executing with the computer. Multithreading is a technique that allows one program to do multiple tasks concurrently by implementing each task as a separate thread. Threads share an address space, open files, and other resources but each thread typically has its own stack in memory. One advantage of using threads instead of a sequential program is that several operations may be carried out concurrently, and thus events can be handled more efficiently as they occur. Another advantage of using a thread group over using multiple processes is that context switching between threads is much faster than context switching between processes. Also, communication between threads is usually more efficient and easier to implement than communications between processes.

Threads typically execute asynchronously with respect to each other. That is to say, the operating environment does not usually enforce a completion order on executing threads, so that threads normally cannot depend on the state of operation or completion of any other thread. One of the challenges in using multithreading is to ensure that threads can be synchronized when necessary. For example, array and matrix operations are used in a variety of applications such as graphics processing. Matrix operations can be efficiently implemented by a plurality of threads where each thread handles a portion of the matrix. However, the threads must stop and wait for each other frequently so that faster threads do not begin processing subsequent iterations before slower threads have completed computing the values that will be used as inputs for later operations.

Barriers are constructs that serve as synchronization points for groups of threads that must wait for each other. A barrier is often used in iterative processes such as manipulating an array or matrix to ensure that all threads have completed a current round of an iterative process before being released to perform a subsequent round. The barrier provides a "meeting point" for the threads so that they synchronize at a particular point such as the beginning or ending of an iteration. Each iteration is referred to as a "generation". A barrier is defined for a given number of member threads, sometimes referred to as a thread group. This number of threads in a group is typically fixed upon construction of the barrier. In essence, a barrier is an object placed in the execution path of a group of threads that must be synchronized. The barrier halts execution of each of the threads until all threads have reached the barrier. The barrier determines when all of the necessary threads are waiting (i.e., all threads have reached the barrier), then notifies the waiting threads to continue.

A conventional barrier is implemented using a mutual exclusion ("mutex") lock, a condition variable ("cv"), and variables to implement a counter, a limit value and a generation value. When the barrier is initialized for a group of threads of number "N", the limit and counter values are initialized to N, while the variable holding the generation value is initialized to zero. By way of analogy, using a barrier is akin to organizing a group of hikers to wait at a particular place (e.g., wait at the Long's Peak trailhead) until a certain circumstance has occurred (e.g., until all hikers have arrived). The cv is essentially that name of the place at which each of the threads wait, but is not otherwise manipulated by the threads using the barrier. The limit variable represents the total number of threads while the counter value represents the number of threads that have previously reached the waiting point.

A thread "enters" the barrier and acquires the barrier lock. Each time a thread reaches the barrier, it checks to see how many other threads have previously arrived by examining the counter value, and determines whether it is the last to arrive thread by comparing the counter value to the limit. Each thread that determines it is not the last to arrive (i.e., the counter value is greater than one), will decrement the counter and then execute a "cond_wait" instruction to place the thread in a sleep state. Each waiting thread releases the lock and waits in an essentially dormant state.

Essentially, the waiting threads remain dormant until signaled by the last thread to enter the barrier. In some environments, threads may spontaneously awake before receiving a signal from the last to arrive thread. In such a case the spontaneously awaking thread must not behave as or be confused with a newly arriving thread. Specifically, it cannot test the barrier by checking and decrementing the counter value.

One mechanism for handling this is to cause each waiting thread to copy the current value of the generation variable into a thread-specific variable called, for example, "mygeneration". For all threads except the last thread to enter the barrier, the mygeneration variable will represent the current value of the barrier's generation variable (e.g., zero in the specific example). While its mygeneration variable remains equal to the barrier's generation variable the thread will continue to wait. The last to arrive thread will change the barrier's generation variable value. In this manner, a waiting thread can spontaneously awake, test the generation variable, and return to the cond_wait state without altering barrier data structures or function.

When the last to arrive thread enters the barrier the counter value will be equal to one. The last to arrive thread signals the waiting thread using, for example, a cond_broadcast instruction which signals all of the waiting threads to resume. It is this nearly simultaneous awakening that leads to the contention as the barrier is released. The last to arrive thread may also execute instructions to prepare the barrier for the next iteration, for example by incrementing the generation variable and resetting the counter value to equal the limit variable. Expressed in pseudocode, the above steps may be represented as shown in Table 1.

TABLE 1

```
Initialize barrier for N thread usage
        counter=N              /*N threads in group*/
        limit=N                /*N threads in group*/
        generation=0
wait
        acquire lock
        if counter= =1         /*detect last to arrive thread*/
            generation ++      /*prepare for next iteration*/
            counter=limit      /*prepare for next iteration*/
            cond_broadcast     /*awaken waiting threads*/
        Else                   /*copy generation variable*/
            mygeneration=generation  /*decrement counter*/
            counter--
            while mygeneration= =generation
                cond_wait      /*wait until next iteration*/
        release lock
```

Before leaving the barrier, each of the awakened threads must acquire the barrier's lock, however, only one thread can own the lock at any time. The awakened threads will attempt to acquire the lock as many times as necessary. Because they are all trying to acquire the lock concurrently, most of the threads will have to make multiple attempts to acquire the lock. After each failed attempt, the thread will go back into a wait state, idle for several clock cycles, then attempt to reacquire the lock. When a large number of threads are using a barrier (e.g., more than eight threads), the delay incurred by the last to leave thread can be significant.

When exiting the barrier, the threads have been explicitly synchronized and so contention for the mutex lock necessarily exists. Consider when there are N threads in a group, although one thread will leave the barrier on the first attempt, each other thread will be required to make multiple attempts. The last thread to leave the barrier will have made N−1 attempts before it is able to acquire the mutex lock and leave the barrier. In some cases, the first thread or threads to leave the barrier may complete the next iteration and arrive back at the barrier before all of the previous generation threads have managed to leave the barrier. While this "lapping" phenomena can be controlled with appropriate coding, it demonstrates the limitations of conventional barrier structures.

When the number of threads using a barrier becomes large, a single mutex becomes a critical resource. As the number of threads grows, the overhead created by this contention increases non-linearly and can negatively affect performance. As a result, conventional barrier implementations do not scale well. This contention has a negative impact on application performance as time and processor resources are consumed in arbitrating for control over the mutex lock rather than executing application programs. Therefore, a need exists for an efficient method and apparatus for synchronizing threads.

A semaphore is another type of synchronization construct. A semaphore is typically implemented as a mutex, condition variable and counter. A semaphore is used to manage access to a limited resource. A physical example of a semaphore is a queue at a bank waiting for a teller. When there are X tellers, there cannot be more than X customers served concurrently. The duration of any particular service request is variable. In order to get service you need one of the X tellers. In the following example assume that the number of tellers (X) is 2. The first customer to arrive at the bank notices that there is a free teller and begins a transaction. Before the transaction completes a second customer arrives and notices that there is a free teller and begins a transaction. Before the first and second customers are serviced a third customer arrives and notices that there are no free tellers. The customer waits in queue. At this point it does not make any difference which of the two tellers becomes available first, the first available teller will service customer 3. If a fourth customer arrives before the first two customers are serviced, they will wait in queue with customer 3.

The semaphore consists of three operations: initialize, post and wait. The initialize operation sets the initial value of the semaphore, in the teller example the value would be two (2). Note that this is only the initial value of the semaphore. The value of the semaphore can never be less than zero (0). The post operation increases the value of the semaphore by one (1) and wakens a thread (via a cond_signal) if the value of the semaphore was zero (0). A wait operation will test the value of the semaphore, if the value is zero (0) the thread will block waiting (via a cond_wait) for it to become non-zero. If the value of the semaphore is non-zero, the thread decrements by one (1) and continues.

Returning to the teller example, another teller (e.g., a third teller in the particular example) may open to service customers (due to detection of a long queue). In the semaphore case, this would be analogous to a post operation. A teller may also close if they detect that there are idle tellers (e.g. too few customers). In the semaphore case this would be analogous to a wait operation. Note that in these two examples the post and wait are performed by the tellers (i.e., resources) and not by customers (i.e., consumers).

The only place where the analogy is not strong is that a semaphore with waiters does not implement a queue, instead it is the "free-for-all" approach. When a post operation occurs on a semaphore that was zero (0) and has waiters, the waiting threads are woken and can attempt to acquire the resource.

SUMMARY OF THE INVENTION

Briefly stated, the present invention involves mechanisms and processes for synchronizing a group of threads that use a semaphore for each waiting thread to implement a barrier. A barrier is created comprising a counter, a semaphore list, and at least one mutual exclusion (mutex) lock. For each thread using the barrier, it is determined whether that thread is the last to arrive. For each thread that is not the last to arrive at the barrier, the thread is caused to wait on its semaphore. The last thread to arrive at the barrier causes each waiting thread to resume execution.

In another aspect, the present invention involves a computer system for executing an application comprising a plurality of synchronized threads of execution. The computer system includes a memory and a processor for executing programmed instructions in the memory. A multithreading operating system supports multiple threads of execution in the memory. A barrier is implemented in the memory comprising a counter, a semaphore list identifying a plurality of semaphores, and a mutual exclusion lock.

DETAILED DESCRIPTION OF THE PREFERRED EMBODIMENTS

The present invention is illustrated and described in terms of a multithreaded program execution environment including both single processor and multiprocessor computer systems. The present invention involves a new type of barrier operable to synchronize threads using constructs that are widely available in a variety of program execution environments. The particular examples are described using specific instructions sequences, however, it is contemplated that the present invention is readily adaptable to a variety of environments.

Figure 1:
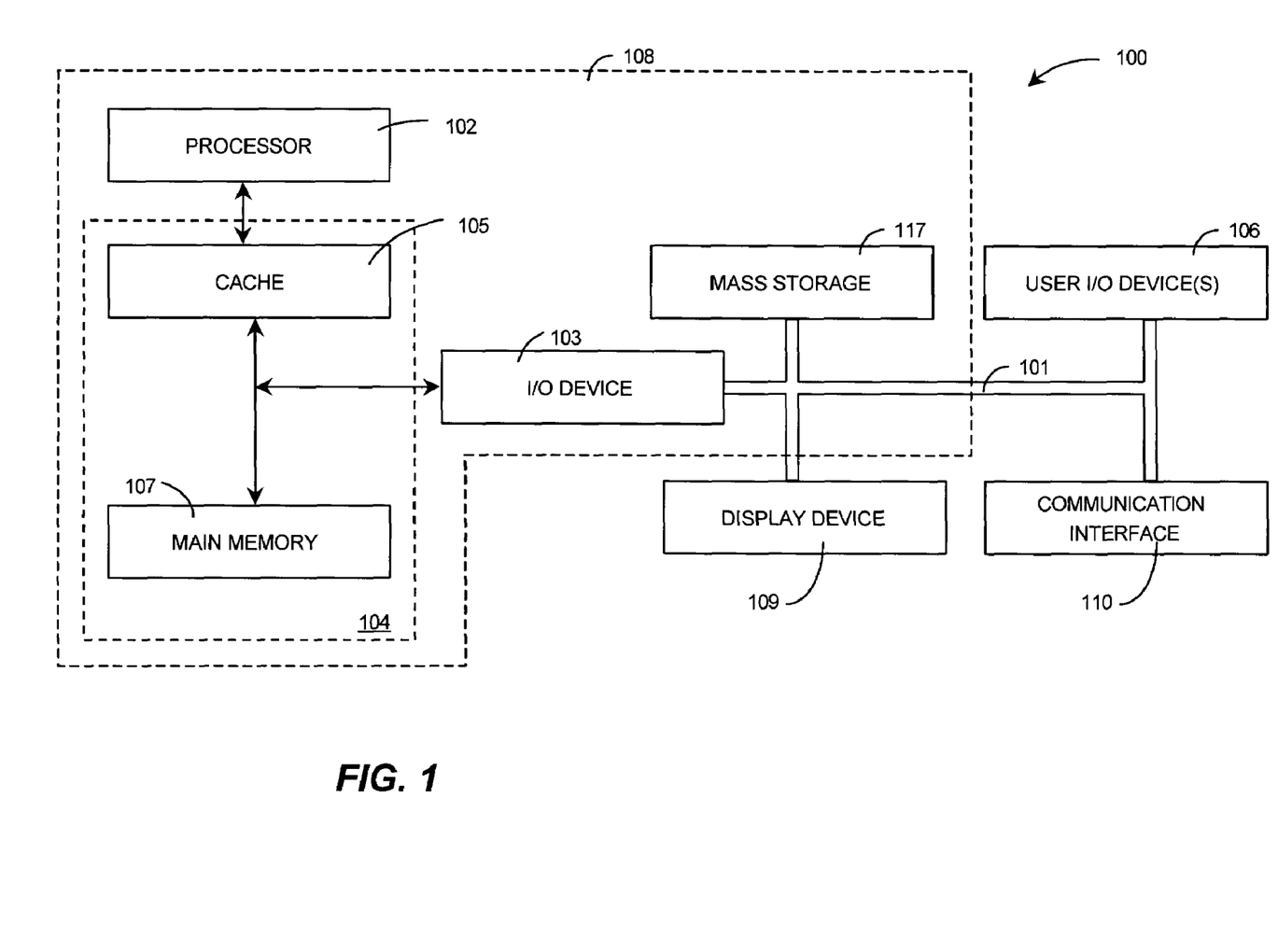
FIG. 1 shows a computer environment in which the present invention is implemented.

FIG. 1 illustrates in block diagram form a computer system incorporating an apparatus and system in accordance with the present invention. Processor architectures and computing systems are usefully represented as a collection of interacting functional units as shown in FIG. 1. These functional units perform the functions of fetching instructions and data from memory, processing fetched instructions, managing memory transactions, interfacing with external I/O and displaying information.

FIG. 1 shows a typical general-purpose computer system 100 incorporating a processor 102. Computer system 100 may include multiple processors 102 as well. One or more threads may execute in processor 102 to implement, for example, an application program and an operating system. Computer system 100 in accordance with the present invention comprises a system bus 101 for communicating information and processor 102 coupled with bus 101 through input/output (I/O) devices 103 within processor 102. Processor 102 is coupled to memory system 107 using a memory bus 103 to store information and instructions for processor 102. Memory system 107 comprises, for example, one or more levels of cache memory and main memory in memory unit 107. It should be understood that some cache memory may be included on-chip with processor 102 in most implementations in addition to cache and memory in memory system 107.

User I/O devices 106 are coupled to bus 101 and are operative to communicate information in appropriately structured form to and from the other parts of computer 100. User I/O devices may include a keyboard, mouse, magnetic or tape reader, optical disk, or other available I/O devices, including another computer. Mass storage device 117 is coupled to bus 101 and may be implemented using one or more magnetic hard disks, magnetic tapes, CD ROMs, large banks of random access memory, or the like. A wide variety of random access and read-only memory technologies are available and are equivalent for purposes of the present invention. Mass storage 117 includes computer programs and data stored therein. Some or all of mass storage 117 may be configured to be incorporated as part of memory system 107.

The present invention is particularly useful in operating systems that support multi-threading. However, many times programs are authored and/or compiled for multithreading systems and yet executed on both multithreading and non-multithreading operating systems by forcing only one thread at a time to execute. Moreover, the present invention can be used on operating systems that implement multithreading and non-multithreading modes on a task-by-task basis. The computer program devices in accordance with the present invention are implemented in the memory of the various devices shown in FIG. 1 and enabled by the data processing capability of the processor 102.

Figure 2:
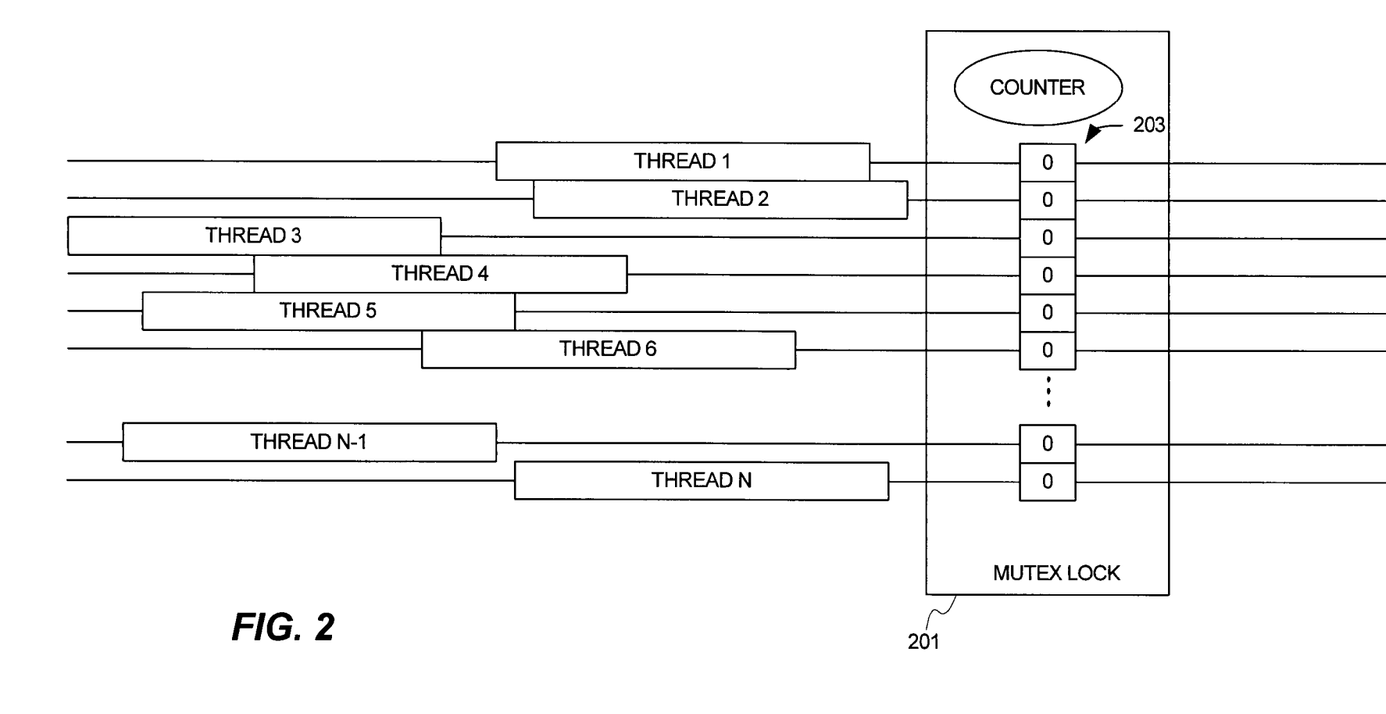
FIG. 2 shows operation of a group of threads before reaching a synchronization barrier in accordance with the present invention.

FIG. 2 illustrates a group of N threads that are designated as a synchronization group as they all use a common barrier mechanism 201. Any number of threads may be executing concurrently in a computer system 100, only N of which are using barrier 201. Hence, a large number of threads may continue execution unaffected by barrier 201. Also, any number of independent barriers 201 may exist at any given time.

Barrier 201 comprises a mutex lock, a semaphore list 203 having a semaphore for each thread using barrier 201, a counter variable, and a limit variable. Barrier 201 is initialized by setting the counter variable to a value indicating the number of threads that will use the barrier. In the specific example, that number is N. The specific examples herein use a count down mechanism such that each time a member thread reaches the barrier 201 the counter is decremented. In this manner the counter value indicates the number of member threads that have not yet reached barrier 201, and will reach a value of one when the last member thread arrives. Alternatively, the initial value may be set at N−1 so that the counter value is zero upon arrival of the last member thread at the barrier. In other alternatives, count-up mechanisms or other counting mechanisms may be used to determine when all threads have arrived at a barrier, depending on the instructions and mechanisms available in a particular operating environment.

Semaphore list 203 comprises a plurality of entries or semaphores such that one semaphore is associated with each waiting thread. Upon initialization semaphore list 203 is empty. It is not necessary to allocate a particular semaphore to a particular thread when barrier 201 is constructed, hence, barrier 201 does not need to "know" anything more than a count of threads that will use the barrier. Each semaphore may be implemented by a conventional counting semaphore implemented by a variety of operating systems such as Solaris®, Unix, Linux, NT, OS/2, and the like. Solaris is a trademark or registered trademark of Sun Microsystems, Inc. of Palo Alto, Calif. in the United States and other countries.

A semaphore is a construct that can be incremented to an arbitrarily high value using a "sema_post" instruction, but decremented only to zero using a "sema_wait" instruction. A thread can wait on a semaphore value, typically entering a wait state until the semaphore value is non-zero. Unlike many synchronization variables implemented by operating systems, a semaphore can be incremented by other threads. This collection of properties makes the semaphore a useful mechanism for implementing a barrier. Expressed in pseudocode, the semaphore operations may be represented as shown in Table 2.

TABLE 2

| | |
|---|---|
| Initialize semaphore | |
| counter=N | /*set counter to number of events*/ |
| sema_wait | |
| acquire lock | |
| while counter= = 0 | /*determine whether event is satisfied* |
| cond_wait | /*wait*/ |
| counter-- | /*decrement counter*/ |
| release lock | |
| sema_post | |
| acquire lock | |
| if counter= = 0 | /*determine whether event is satisfied* |

TABLE 2-continued

| | |
|---|---|
| cond_signal | /*wake other threads*/ |
| counter++ | /*increment counter*/ |
| release lock | /*continue execution*/ |

As shown in FIG. 2, the N member threads may arrive at barrier 201 in any order (i.e., asynchronously). A thread "arrives" at barrier 201 when it reaches an instruction in its instruction path that causes it to acquire the lock in barrier 201. Once the lock is acquired, it tests the counter variable. In the particular example, the counter variable holds a value indicating the number of threads that have not yet reached the barrier 201. Accordingly, if the counter value is one, that thread is the last to arrive. When the counter value is greater than one, the thread will wait for arrival of all other threads.

With the exception of the last to arrive thread, each arriving thread decrements the counter value, adds a semaphore to the semaphore list, releases the barrier's lock and enters a wait state. The wait state is implemented, for example, by a sema_wait instruction performed against the semaphore associated with that thread. In this manner, each thread is associated with an independent semaphore, therefore each thread is waiting on an independent (rather than shared) resource. As a result, there is no contention for access to that resource as would be the case for a shared resource. As set out in reference to Table 2, each semaphore will itself comprise a lock, a condition variable, and a counter. These resources that implement the semaphore are associated with the waiting thread, not the barrier itself, and in fact are independent from the lock and counter associated with the barrier 201. As such, a waiting thread does not need to re-acquire the lock of barrier 201, but instead it will re-acquire the semaphore lock for which there is no contention.

In the case of the last to arrive thread, the barrier's lock is acquired and the counter value will indicate it is the last to arrive thread (e.g., COUNTER=1). When this condition exits, for each semaphore in semaphore list 203 the last to arrive thread performs a "sema_post" which increments the counter for that semaphore and signals (e.g., via a cond_signal) the thread waiting on that semaphore to wake up. Although each semaphore is associated with a particular thread, any thread (in this case the last to arrive thread) can execute a sema_post against the semaphore.

It should be appreciated that in the examples, only a single thread is waiting for each semaphore, hence, there is not contention when the threads wake up. As each waiting thread receives the cond_signal it will, concurrently with other threads, access the semaphore associated with that thread, acquire that semaphore's lock, and return from the sema_wait. In this manner, the many waiting threads will leave the barrier 201 substantially concurrently with no contention over shared resources.

Expressed in pseudocode, the semaphore operations may be represented as shown in Table 3.

TABLE 3

| | |
|---|---|
| Initialize barrier for N threads | |
| counter=N | /*set counter to number of threads*/ |
| limit=N | /*set limit to number of threads*/ |
| | /*note: semaphore list is empty*/ |
| wait | |
| acquire barrier lock | |
| if counter==1 | /*determine whether this is last to arrive thread*/ |
| For each semaphore in list | |
| sema_post | /*wake threads*/ |
| counter=limit | /*reset counter for next iteration*/ |
| release barrier lock | |
| else | |
| counter-- | /*decrement barrier counter*/ |
| Add semaphore to semaphore list | /*associate semaphore with thread*/ |
| Release barrier lock | |
| Sema_wait | /*cause thread to wait on its semaphore*/ |

Figure 3:
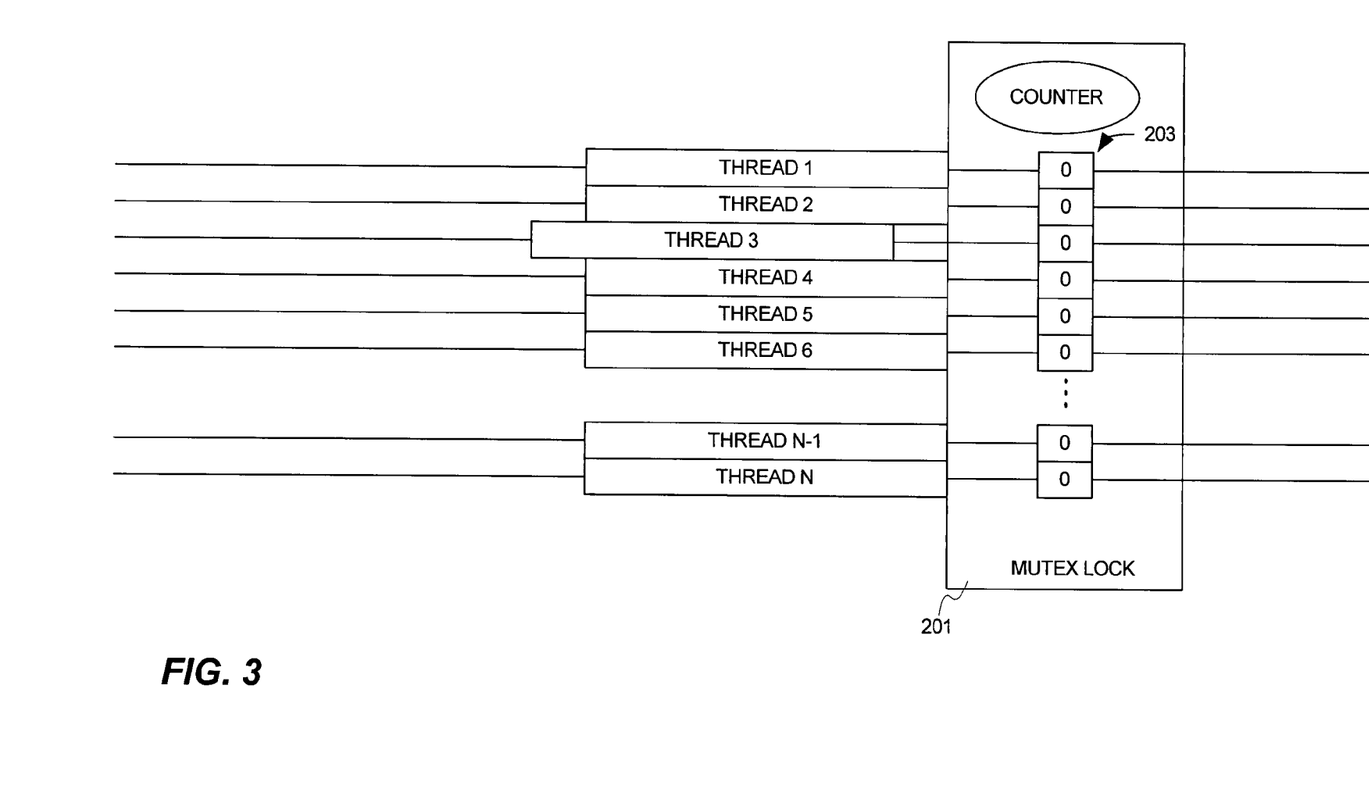
FIG. 3 shows operation of the group of threads while reaching a synchronization barrier in accordance with the present invention.
Figure 4:
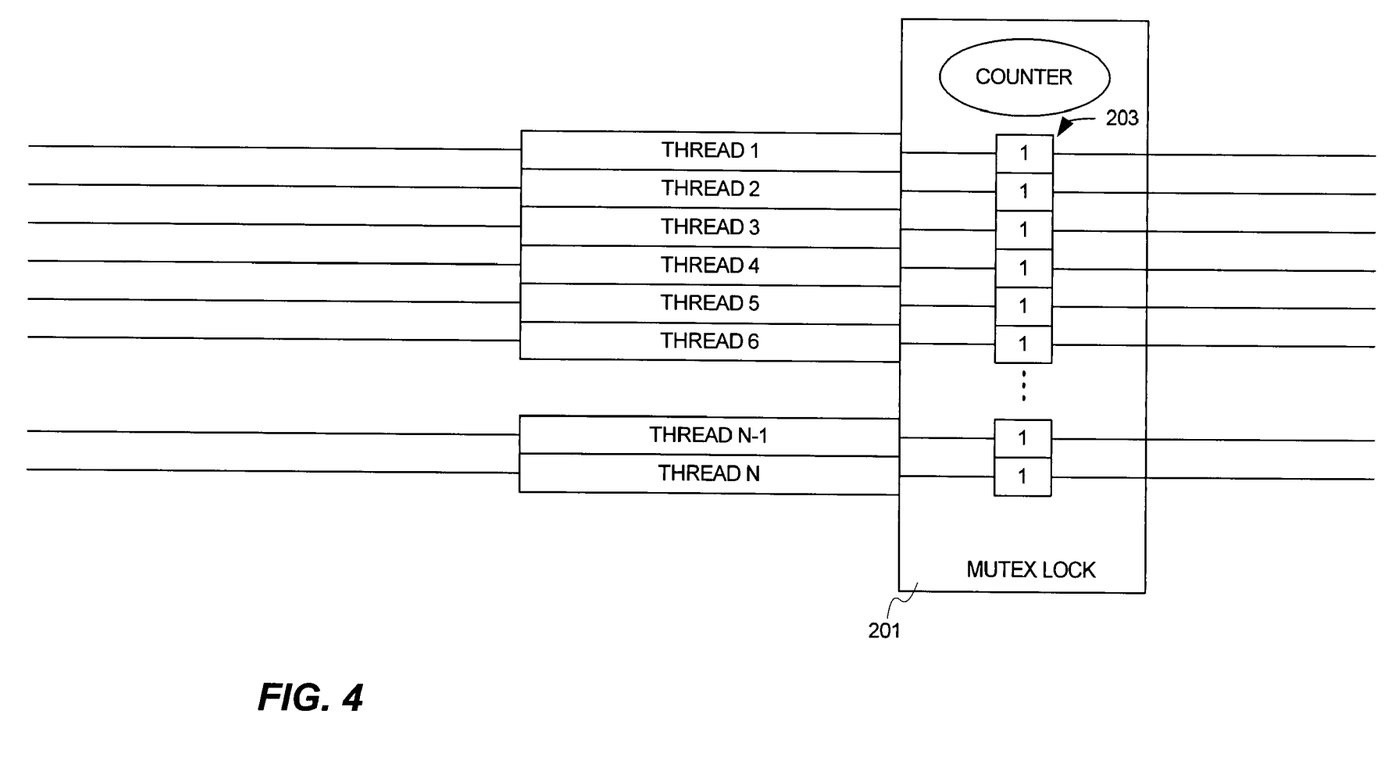
FIG. 4 shows operation of a group of threads after all threads have reached a synchronization barrier in accordance with the present invention.

In FIG. 3, N−1 threads have arrived at barrier 201, while THREAD 3, which is the last to arrive, continues to execute. At this stage, all threads other than THREAD 3 are in a wait or sleep state. The counter value of each of the semaphores remain at their initial non-zero value. Barrier 201 determines from the counter when the last to arrive thread (i.e., THREAD 3 in the example) has arrived as shown in FIG. 4. In response, all of the semaphore values are set to a value that will enable the calling threads to continue execution. Using conventional semaphore techniques, each semaphore can be accessed using a "sema_post( )" call which locks the semaphore, increments its counter value, and unlocks the semaphore. The change in value of the semaphore is accompanied by a signal (i.e., cond_signal) to the waiting threads causing them to wake. Notably, this will require N operations for a group of N threads and, unlike conventional barriers, there is no contention for the semaphores' locks. Each thread will concurrently lock its allocated semaphore, test its value, and presumably continue execution upon determining that the semaphore is no longer set to cause a wait state.

Figure 5:
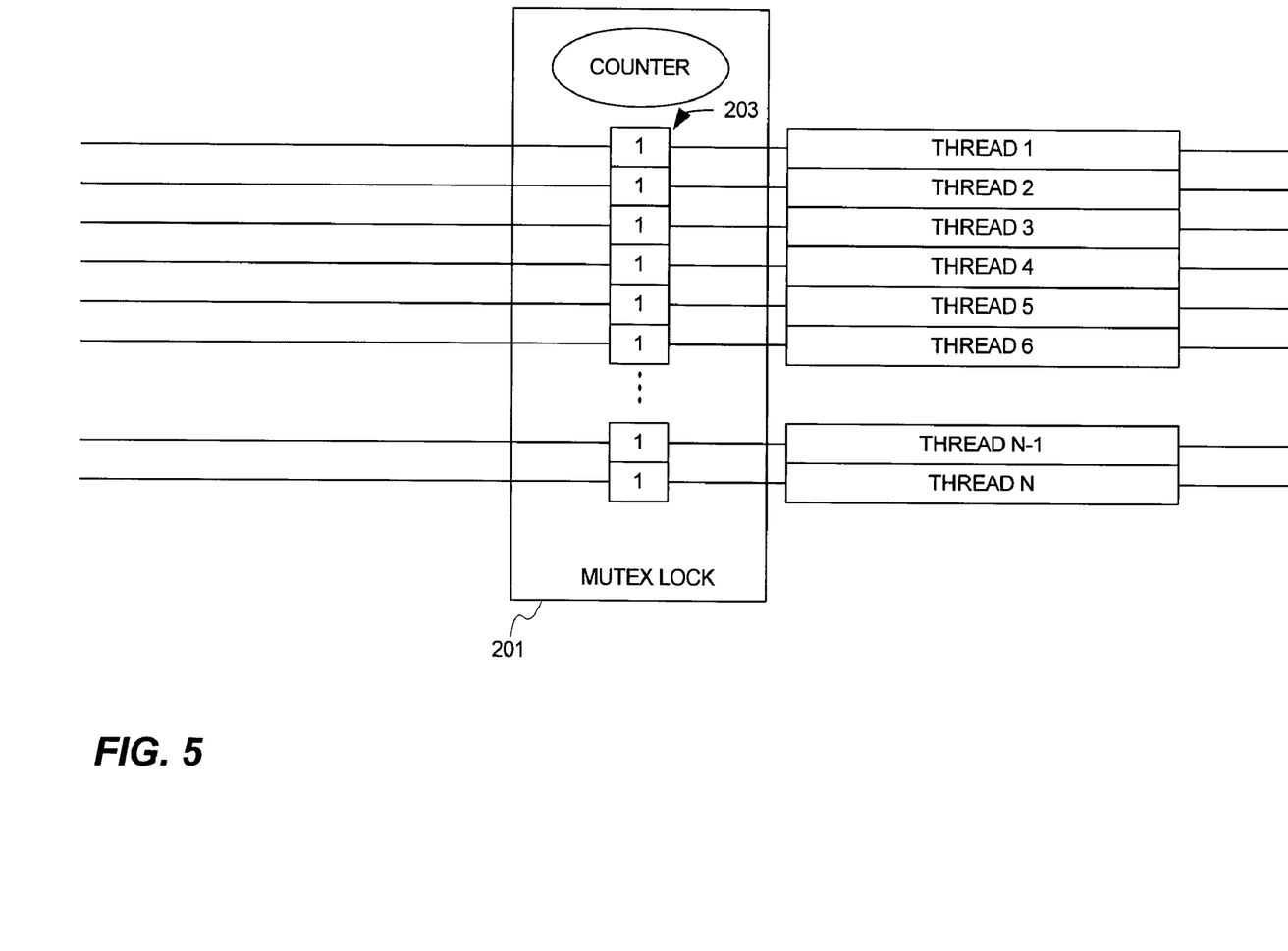
FIG. 5 shows operation of a group of threads after being released from a synchronization barrier in accordance with the present invention.

As shown in FIG. 5, the N threads will concurrently or substantially concurrently leave the barrier 201. Because each thread is accessing its own semaphore, there is no contention for the mutex protecting the semaphore. Hence, each thread needs to make only a single sema_wait( ) call rather than possibly making up to N calls to a condition variable as was required by prior barrier structures.

Figure 6:
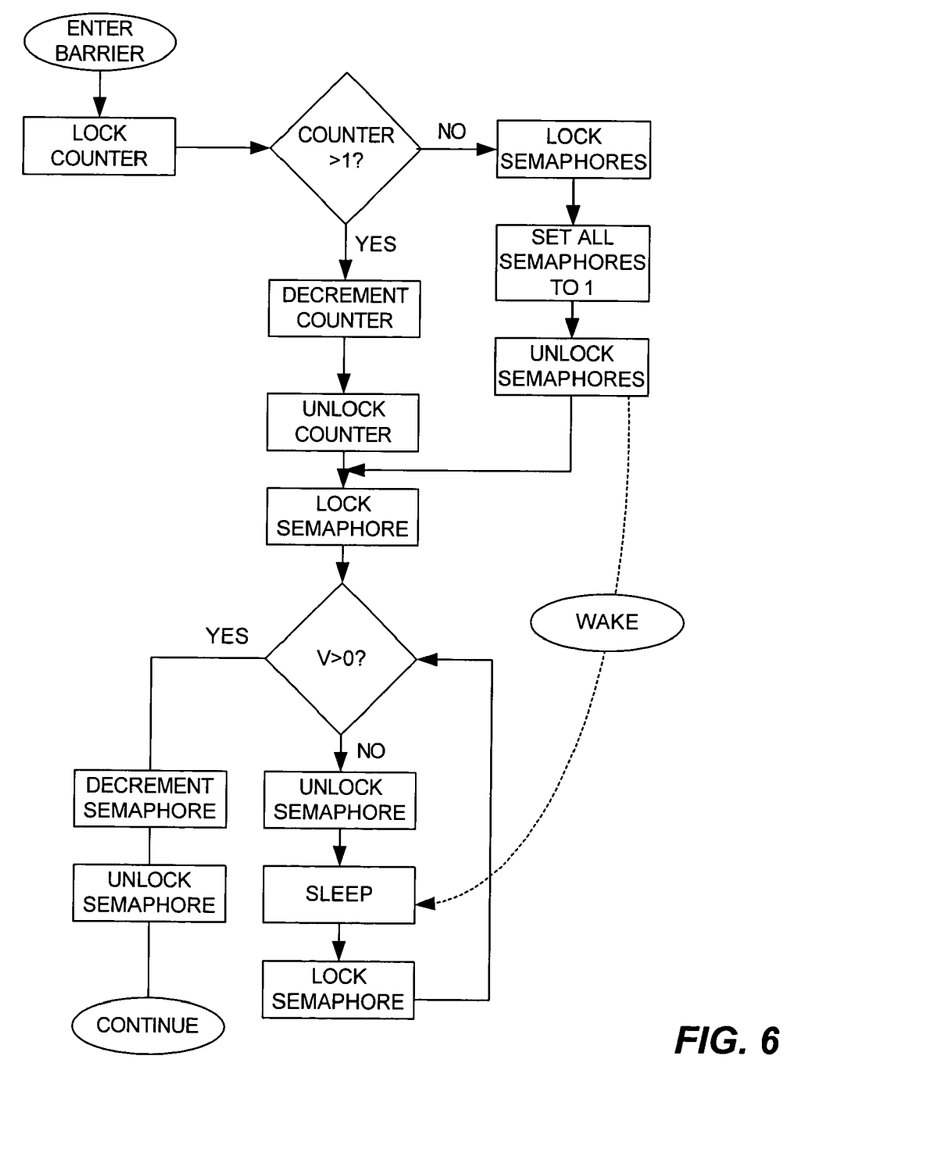
FIG. 6 illustrates in flow-diagram form actions involved in an implementation of a synchronization barrier in accordance with the present invention.

FIG. 6 illustrates an exemplary flow diagram of activities involved in implementing a barrier in accordance with the present invention. It should be noted that FIG. 6 does not show the initialization of a barrier structure, which essentially creates a mutex lock (referred to herein as the "barrier lock"), a counter variable having an initial value of N (where N is the number of threads using the barrier), a limit variable having a value of N, and a semaphore list which is empty. FIG. 6 also omits details of initializing each semaphore as threads enter the barrier. Each semaphore is protected by its own mutex implicitly as there are no explicit functions to lock and unlock the semaphore.

When a thread enters the barrier, the barrier lock is acquired and tested to determine if the entering thread is the last to arrive. In the specific example, a counter value equal to one indicates that this is the last thread to arrive, whereas a non-unity counter value indicates that at least one thread has not yet arrived. When more threads are to arrive (e.g., the "NO" path), the counter is maintained, for example, by decrementing its value in. A semaphore is initialized for the arriving thread, for example, using a sema_init command in a POSIX environment or the equivalent. The semaphore that was initialized is added to semaphore list. This involves, for example, adding an identifier or pointer to the semaphore in the list 203. At this point, the barrier lock may be released in 611, and the arriving thread implements a command such as a sema_wait which causes that thread to remain dormant. The thread will normally remain dormant until receiving a signal such as cond_signal after which it will continue execution.

Although not shown in FIG. 6, it is often useful to cause a thread that has been woken to implement a sema_wait command to acquire the semaphore lock, check the counter, and release the semaphore lock before resuming execution. Because each thread has its own semaphore in accordance with the present invention, such operation does not cause the delays associated with lock contention.

When the entering thread is the last to arrive, operation follows the path labeled "YES". The operations are performed for each semaphore on semaphore list 203, and hence are performed for each waiting thread. The operations are essentially a sema_post operation in, for example, a POSIX environment, that are performed for each waiting thread. The semaphore lock is acquired, and then the sema_post operation checks the semaphore counter in, although the counter value will presumably be at zero. For each semaphore, a cond_signal is implemented to signal each waiting thread to awake. The semaphore counter is incremented. For each semaphore, the semaphore lock is released. Upon completion of the sema_post for all semaphores, the counter is reset to the limit value, and the barrier lock is released such that the barrier 201 is ready for a subsequent iteration.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for execution in a processor having a plurality of threads executing thereon, the method comprising:
   with processes executed by the processor, creating a barrier comprising a counter, a semaphore list identifying a plurality of semaphores, and at least one mutual exclusion (mutex) lock;
   for each thread using the barrier, determining whether that thread is the last to arrive;
   for each thread that is not the last to arrive at the barrier, causing each thread to wait on an independent semaphore and modifying the counter to have a value indicating a number of threads that have or have not entered the barrier; and
   for the last thread to arrive at the barrier, with the processes executed by the processor, causing each waiting thread to resume execution substantially concurrently by setting a value of the semaphore associated with each one of the waiting threads to a value that will cause the waiting threads to continue execution.

2. The method of claim 1 further comprising creating a list of semaphores, wherein the list identifies each semaphore upon which a thread is waiting.

3. The method of claim 2 wherein the act of causing each waiting thread to resume execution further comprises using the list of semaphores to single each waiting thread.

4. The method of claim 1 wherein each waiting thread can resume execution without referencing any resource that is shared by all of the waiting threads.

5. The method of claim 1 wherein at least some of the threads using the barrier resumes execution concurrently.

6. The method of claim 1 further comprising for each thread that is not the last to arrive at the barrier, initializing a semaphore having data structures that are independent of data structures used by the barrier.

7. The method of claim 6 wherein the data structures for each semaphore are associated with a single thread.

8. The method of claim 7 further comprising for each thread that is not the last to arrive at the barrier causing the thread to make a sema_wait call to the semaphore associated with that thread.

9. The method of claim 6 further comprising initializing a counter within each semaphore to a value that will cause a thread making a call to that semaphore to enter a wait state.

10. The method of claim 9 further comprising, for the last thread to arrive at the barrier, updating the counter to a value that will cause a thread waiting on that semaphore to resume execution.

11. The method of claim 1 wherein the barrier further comprises a counter value indicating the number of threads that are using the barrier, but that have not arrived at the barrier.

12. The method of claim 1 wherein the act of causing each of the waiting threads to resume execution is performed without contention amongst the threads for a shared resource.

13. A computer system for executing an application comprising a plurality of synchronized threads of execution, the computer system comprising:
   a processor;
   a memory coupled to the processor, wherein the processor is configured to execute programmed instructions in the memory;
   a multithreading operating system that supports multiple threads of execution in the memory;
   a barrier implemented in the memory comprising a counter, a semaphore list identifying a plurality of semaphores, and a mutual exclusion lock wherein each semaphore is associated with an independent thread using the barrier and each semaphore is identified on the semaphore list, a counter stored in the memory having a value indicating a number of threads that have or have not entered the barrier; and
   processes executing in the processor for concurrently releasing threads that are waiting on semaphores identified in the semaphore list, wherein the executing processes set a value of the semaphore associated with each of the waiting threads to a value that causes the threads to continue with execution.

14. The computer system of claim 13 further comprising processes executing in the processor for blocking execution of the threads using the barrier by setting the value of the semaphore associated with each thread to a value that will cause the threads to enter a wait state, and causing each of the group of threads to make a call to their associated semaphore.

15. The computer system of claim 13 wherein the counter is initialed to a value indicating the number of threads using the barrier.

16. The computer system of claim 15 wherein the counter is decremented in response to a thread's call to its associated semaphore.

17. A computer-readable storage medium tangibly embodying a program of instructions executable by a machine wherein said program of instructions comprises a plurality of program codes for a synchronization barrier for use in a multi-threaded computing environment, said program of instructions comprising:
   one of said program codes for repeating a semaphore list that identifies a plurality of semaphores, wherein each semaphore is associated with an independent thread using the synchronization barrier;

program code for a counter having a value indicating a number of threads that have or have not entered the synchronization barrier;

program code for processes for blocking execution of a thread using the barrier by setting the value of the semaphore associated with the threads to a value that will cause the thread to enter a wait state, and causing the thread to make a call to its associated semaphore; and program code for processes for concurrently releasing a group of blocked threads by setting the value of the semaphore associated with each of the group of threads to a value that will cause the threads to continue execution.

18. A computer-readable storage medium tangibly embodying a program of instructions executable by a machine wherein said program of instructions comprises a plurality of program codes for a synchronization barrier for use in a multi-threaded computing environment, said program of instructions comprising:

computer program devices operating in a computer system and configured to cause the computer to create a barrier comprising a counter, a semaphore list identifying a plurality of semaphores, and at least one mutual exclusion (mutex) lock;

computer program devices operating in a computer system and configured to determine whether a thread designated as a member of a synchronization group is the last to arrive among the members of the synchronization group and to modify a counter to have a value indicating a number of threads that have or have not entered the barrier;

computer program devices operating in a computer system and configured to cause the computer to, for each thread that is not the last to arrive at the barrier, cause the thread to wait on a separate semaphore that is independent from the mutex lock and barrier counter; and computer program devices operating in a computer system and configured to cause the computer to, after the last thread to arrives at the barrier, cause each one of the waiting threads to resume execution including causing each one of the waiting threads concurrently calling an associated one of the separate semaphores, wherein the resuming of execution further comprises setting a value of the semaphore associated with each one of the waiting threads to a value that causes the waiting threads to continue execution.

19. A computer-implemented method for using a synchronization barrier in a multi-threaded computing environment comprising:

with a processor, executing a plurality of threads asynchronously;

halting the plurality of threads at a synchronization barrier using a separate semaphore for each of the plurality of threads until all of the plurality of threads have reached the synchronization barrier;

modifying a counter to have a value indicating a number of threads that have or have not entered the synchronization barrier; and with processes executed by the processor, concurrently releasing the plurality of threads from the synchronization barrier using the semaphore for each of the plurality of threads, wherein the concurrently releasing comprises setting a value of the semaphore associated with each one of the threads in the group of threads to a value that causes the threads to continue execution.

\* \* \* \* \*

UNITED STATES PATENT AND TRADEMARK OFFICE
CERTIFICATE OF CORRECTION

PATENT NO. : 7,512,950 B1 Page 1 of 1
APPLICATION NO. : 10/641172
DATED : March 31, 2009
INVENTOR(S) : Marejka It is certified that error appears in the above-identified patent and that said Letters Patent is hereby corrected as shown below:

Column 5, line 41, delete "103".
Column 8, line 62, delete "in".
Column 8, line 67, delete "203".
Column 8, line 67, delete "in".
Column 9, line 1, delete "611".
Column 9, line 19, delete "in".
Column 10, line 39, delete "," and insert therefor --;--.

Signed and Sealed this

Twenty-sixth Day of May, 2009

JOHN DOLL
*Acting Director of the United States Patent and Trademark Office*